United States Patent [19]

Kachik

[11] Patent Number: 4,536,237

[45] Date of Patent: Aug. 20, 1985

[54] ALUMINOTHERMIC REDUCTION REACTION MIXTURE

[75] Inventor: Robert H. Kachik, Washington Township, Westmoreland County, Pa.

[73] Assignee: United States Steel Corporation, Pittsburgh, Pa.

[21] Appl. No.: 572,110

[22] Filed: Jan. 20, 1984

[51] Int. Cl.$^3$ .................................. C06B 35/00
[52] U.S. Cl. ................................... 149/37
[58] Field of Search ............................. 149/37

[56] References Cited

U.S. PATENT DOCUMENTS

| | | | |
|---|---|---|---|
| 3,160,537 | 12/1964 | Trafton | 149/37 |
| 3,347,721 | 10/1967 | Jago | 149/37 |
| 3,897,731 | 8/1975 | Bowman | 102/275.5 |
| 4,008,109 | 2/1977 | Norton | 149/37 |
| 4,104,093 | 8/1978 | Yamaji | 149/37 |
| 4,141,769 | 2/1979 | Akiyama | 149/37 |
| 4,150,182 | 4/1979 | Pignocco et al. | 138/145 |

*Primary Examiner*—Edward A. Miller
*Attorney, Agent, or Firm*—Forest C. Sexton

[57] ABSTRACT

An aluminothermic reduction reaction mixture consisting essentially of an admixture of manganese dioxide ($MnO_2$) and metallic aluminum (Al) with alumina ($Al_2O_3$) added thereto. The reaction does not yield a metallic phase, but produces a single phase comprising a galaxite containing slag.

6 Claims, No Drawings

ALUMINOTHERMIC REDUCTION REACTION MIXTURE

BACKGROUND OF THE INVENTION

This invention relates generally to aluminothermic reduction (ATR) reaction mixtures, and more particularly to an ATR mixture which produces only a slag phase and is ideal for use in providing refractory linings in pipes and hollow articles.

ATR techniques have long been known for welding and repairing large metal articles. In these practices, an exothermic reduction reaction mixture, such as a stoichiometric blend of powdered metallic aluminum and iron oxide is ignited. The mixture then reacts rapidly and exothermically wherein the metallic fuel reduces the metal oxide to produce a molten metal phase and a molten slag phase. For ATR mixtures, containing aluminum and iron oxide, the molten phases produced are iron and alumina. By suitably confining or directing the molten reaction products, the molten metal phase can be deposited where desired to weld or repair large metal objects. The slag phase, which floats over the heavier metal phase, can be broken away and discarded.

More recently, ATR techniques have been utilized in processes wherein the slag phase is the desired product. For example, U.S. Pat. No. 4,150,182 teaches a process for providing a refractory liner within tubes, pipe and other hollow cylindrical articles. In this process, an ATR mixture is reacted within the tube or other cylindrical article, and pursuant to one embodiment, the article is rotated on its horizontal axis so that the molten metal phase is first deposited on the interior walls and then the slag phase is deposited thereover. This then provides a corrosion-resistant, abrasion-resistant ceramic liner within the article which is useful for many industrial applications.

In contrast to the prior art processes for providing refractory linings in pipes, cylinders, etc., the patented process described above is quick, inexpensive, requires little capital expenditure and requires no preconditioning of the pipe such as cleaning, pickling, furnace firing, etc. The patented process does, however, have some drawbacks which stem primarily from the fact that the ATR reaction produces an unnecessary metal phase as well as the desired slag phase. Specifically, the ATR process will normally deposit a thin layer of reduced metal phase under the refractory lining. Although this is not normally harmful, there are situations where the deposited metal and the metal pipe are not particularly compatible. This also tends to restrict the process to the lining of metal pipes. In addition, the effervescent nature of the ATR reaction causes the reaction products to spatter and, therefore, the desired refractory lining usually contains small particles of the reduced metal phase. In some applications, this metal could contaminate the fluid passing through the lined pipe.

In another embodiment of the above-mentioned U.S. Pat. No. 4,150,182, the pipe or other hollow cylindrical article is filled with an ATR mixture and disposed in a stationary vertical position. The ATR mixture is then ignited at the exposed upper end. The ATR reaction will progress downward through the article, producing the molten metal and slag phases. As the reaction progresses downward within the hollow article, the molten phases also move downward, whereupon a layer of the slag phase is deposited on the walls of the cooler hollow article. The metal phase does not normally deposit itself on the inner wall of the article in this embodiment but accumulates, increasing in volume as the reaction progresses. When exceptionally long pipes are being coated pursuant to this embodiment, the depth of the molten metal phase may become so great and the upper portion thereof so removed from the hot reaction zone that it will solidify, bridging across the opening through the pipe thereby plugging the pipe or other article. In very long sections of pipe, several such bridges may be formed. Accordingly, here again the unnecessary metal phase causes problems.

SUMMARY OF THE INVENTION

The primary object of this invention is to provide an ATR particulate mixture which produces only slag, as a one-phase reaction product.

Another object of this invention is to provide an ATR particulate mixture which produces only one phase consisting of galaxite ($MnO-Al_2O_3$), a hard refractory material.

Still another object of this invention is to provide an ATR particulate mixture ideally suited for use in those processes wherein exothermic reduction reaction mixtures are utilized to deposit a refractory ceramic material.

These and other objects and advantages of this invention will become apparent from the following detailed description.

DESCRIPTION OF THE PREFERRED EMBODIMENT

The most common ATR mixture utilized in the prior art is a particulate stoichiometric blend of iron oxide ($Fe_3O_4$ or $Fe_2O_3$) as the oxidant and metallic aluminum (Al) as the fuel and reductant. The resulting reaction from ignition of this mixture can generally be represented by:

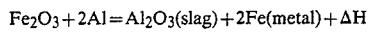
$$Fe_2O_3 + 2Al = Al_2O_3(slag) + 2Fe(metal) + \Delta H$$

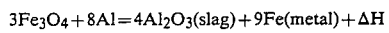
$$3Fe_3O_4 + 8Al = 4Al_2O_3(slag) + 9Fe(metal) + \Delta H$$

The ATR mixture of this invention consists generally of a particulate admixture of manganese dioxide ($MnO_2$) and metallic aluminum, with an inert alumina ($Al_2O_3$) added thereto in amounts of from 15 to 30 weight percent of the total blend. The reaction products produced by the reaction of $MnO_2$ with aluminum can be varied by employing different ratios of aluminum to $MnO_2$ in the mixture. For example, three possible reactions are:

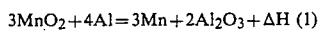
$$3MnO_2 + 4Al = 3Mn + 2Al_2O_3 + \Delta H \quad (1)$$

$$2MnO_2 + 2Al = Mn + Al_2O_3 + MnO + \Delta H \quad (2)$$

$$3MnO_2 + 2Al = Al_2O_3 + 3MnO + \Delta H \quad (3)$$

In the above reactions, the aluminum to $MnO_2$ ratios are 0.41, 0.31 and 0.21, respectively. Reactions (1) and (2) both produce some metal phase manganese, which is generally undesirable for the purposes of this invention. On the other hand, reaction (3) produces only $Al_2O_3$ and MnO which are both slag phases. Reaction (3), as shown above, cannot, or at least should not, be used for the purposes of this invention because it progresses at an extremely fast rate and is explosive in nature. It has been found that the addition of inert $Al_2O_3$ to the mixture shown in reaction (3) will slow the reaction rate to safe levels. The resultant slag will contain substantial amounts of the hard mineral known as galaxite (MnO·Al$_2$O$_3$).

With the Al:MnO$_2$ ratio of 0.21 shown for reaction (3), experiments have shown that the Al$_2$O$_3$ addition to the blend should preferably fall within the range 20 to 25 weight percent to produce a safe controlled rate of reaction. As will be discussed below, this range of Al$_2$O$_3$ addition can be broadened to about 15 to 30 weight percent by varying the particle size of the metallic aluminum. Normally, Al$_2$O$_3$ additions of less than 15 to 20 weight percent result in reaction rates which are still too fast to be safe, while Al$_2$O$_3$ additions of more than 25 to 30 weight percent results in reaction rates that progress too slowly to produce a satisfactory slag coating. The preferred blend consists of about 63 wt. % MnO$_2$, 14 wt. % Al and 23 wt. % Al$_2$O$_3$.

It has been found that the particle size of the aluminum has an effect on the reaction rate. Ideally, the metallic aluminum should have a particle size of about 100 mesh. The use of coarser sized, aluminum particle, e.g. 20 mesh, will decrease the reaction rate. When using metallic aluminum having a particle size generally of about 100 mesh, the Al$_2$O$_3$ addition should be maintained within the range 20 to 25 weight percent. Either coarser or finer aluminum particle sizes can be used satisfactorily if the Al$_2$O$_3$ addition is adjusted accordingly.

Although MnO$_2$ is available from a number of chemical suppliers in a reasonably pure form, the best results have been obtained with technical grade MnO$_2$ (80 to 85%) purchased from Fisher Scientific Company. The impurities in this material tend to be of just the proper nature and composition to optimize the results for the purposes of this invention. Reagent grade MnO$_2$ can, of course, be used satisfactorily if the aluminum and Al$_2$O$_3$ contents are adjusted accordingly, depending upon the amount of MnO$_2$ in the material.

EXAMPLE

To better illustrate the benefits of this invention, a detailed test is described below wherein a 6-foot length of 1-½ inch, AISI Type 304 stainless steel pipe was provided with an approximately 1/8 inch thick ceramic coating, as follows:

(1) The pipe was positioned vertically upright on a lidded catch basin.

(2) The pipe was positioned over a 1-inch-diameter hole in the lid, while the hole itself was covered with a sheet of aluminum foil.

(3) The pipe was then filled with 7.1 pounds of ATR mixture consisting of 63.7 wt. % technical grade MnO$_2$ (80%), 13.2 wt. % aluminum powder (100 mesh), and 23 wt. % Al$_2$O$_3$ (Alcoa tubular).

(4) The mixture was ignited at the exposed top end of the pipe using the flame from a railroad flare.

(5) The mixture burned from the top of the pipe to the bottom in about 13 minutes with no bridging over.

(6) When the reaction reached the foil-covered hole in the catch basin lid, the foil melted and the excess reaction product drained from the pipe into the catch basin. This excess reaction product weighed only about 1 ounce.

(7) After cooling, the pipe was inspected with a borescope. While the ceramic refractory lining exhibited some small lumps and bumps, it was otherwise smooth, continuous, uniform and free of cracks.

I claim:

1. An aluminothermic reduction reaction mixture, which produces only a slag phase, consisting essentially of a particulate admixture of metallic aluminum, manganese dioxide and alumina having an aluminum to manganese dioxide ratio of approximately 0.21 and an alumina content of from 15 to 30 weight percent.

2. An aluminothermic reduction reaction mixture according to claim 1, wherein the metallic aluminum has a particle size of approximately 100 mesh and the admixture contains from 20 to 25 weight percent alumina.

3. An aluminothermic reduction reaction mixture of claims 1 or 2, wherein said manganese dioxide is a technical grade containing 80 to 85% MnO$_2$.

4. An aluminothermic reduction reaction mixture consisting essentially of a particulate admixture of about 63 wt. % manganese dioxide, 14 wt. % aluminum, and 23 wt. % alumina.

5. An aluminothermic reduction reaction mixture according to claim 4, wherein said manganese dioxide is a technical grade containing 80 to 85% MnO$_2$.

6. An aluminothermic reduction reaction mixture according to claims 4 or 5, wherein said aluminum has a particle size of about 100 mesh.

* * * * *